Aug. 11, 1964　　　S. KRIZMAN　　　3,144,254
SEAL CONSTRUCTION FOR POWER CYLINDER
Filed July 3, 1961　　　　　　　　　　2 Sheets-Sheet 1

INVENTOR.
STEVE KRIZMAN
BY
ATTORNEY

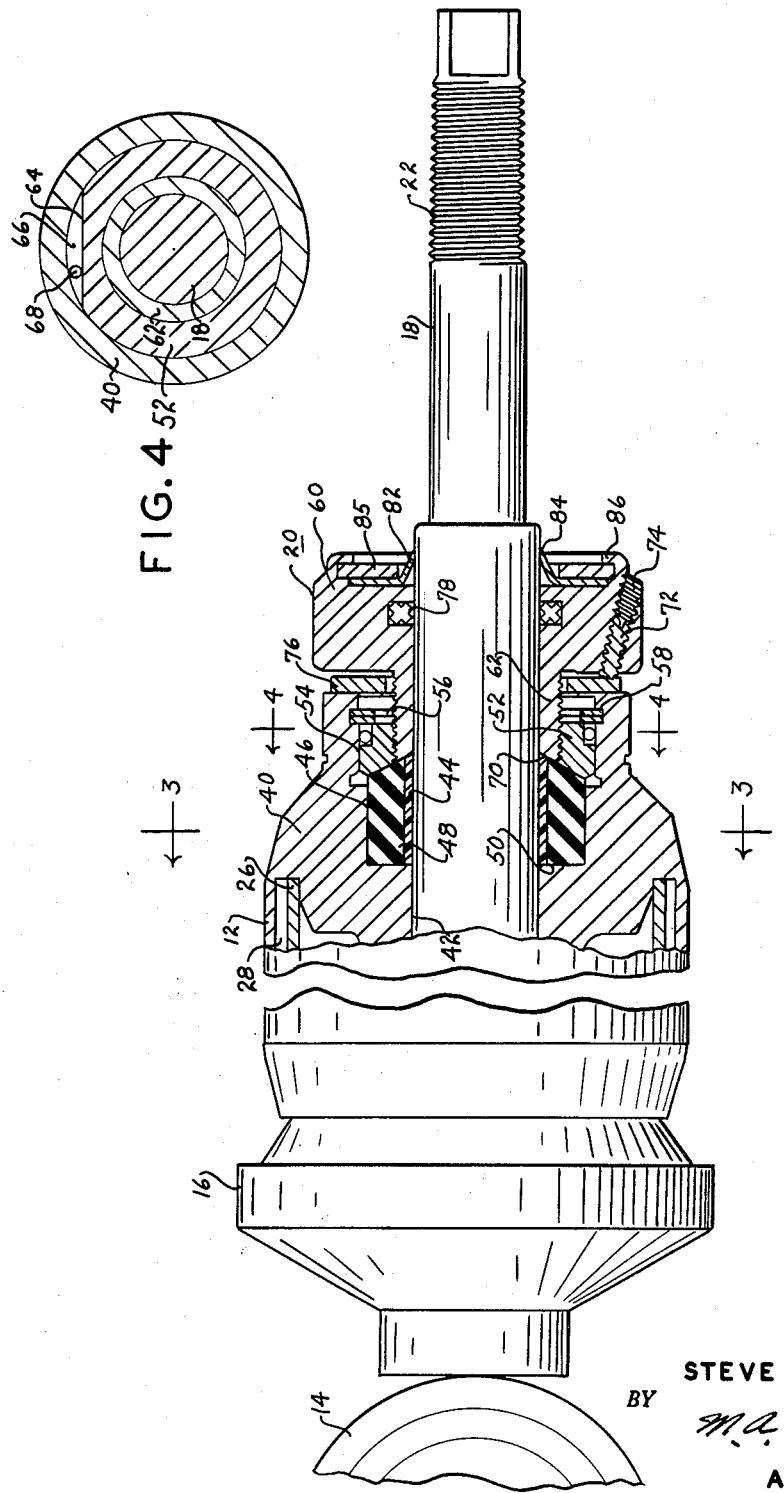

United States Patent Office 3,144,254
Patented Aug. 11, 1964

3,144,254
SEAL CONSTRUCTION FOR POWER CYLINDER
Steve Krizman, South Bend, Ind., assignor to Krizman Manufacturing Co., Inc., South Bend, Ind., a corporation of Indiana
Filed July 3, 1961, Ser. No. 121,604
9 Claims. (Cl. 277—111)

The present invention relates to a power cylinder and more particularly to a seal construction for power cylinders, especially hydraulic cylinders such as those used in power steering systems.

In the standard hydraulically operated power steering system, normal operation over a period of time results in wear in the seal and/or cylinder rod and a consequent leakage of hydraulic fluid from the cylinder, thus creating a constant service problem or, as in the past, an expensive repair job. Initially when the wear occurs, the leakage can be prevented or stopped by merely tightening the seal; however, this means of compensating for the wear is limited and often results in difficult operation of the rod in the seal and cylinder. Further, as the wear progresses, elimination of leakage in this manner is not possible and has in the past required a complete replacement of the seal and rod or the entire cylinder assembly at a substantial service and repair part cost, usually requiring removal of the complete cylinder from the automobile and disassembling the parts thereof. It is therefore one of the principal objects of the present invention to provide a seal construction for fluid cylinders which can be readily assembled on the cylinder and tightened in place without the use of any tools, or with the use of merely conventional pliers or wrenches, and which can be readily adjusted to properly seal the end of the cylinders around the rods regardless of variations in the wear of the rods from one cylinder to another.

Another object of the invention is to provide a seal construction for fluid cylinders which can be easily and quickly assembled on the cylinder without the use of any special skill or equipment being required, and which can be readily adjusted from time to time to compensate for any normal wear throughout the operational life of the cylinder.

Still another object of the invention is to provide a seal of the aforesaid type for fluid cylinders such as the hydraulic cylinders used in power steering systems for automobiles, which forms an effective seal around the cylinder rod without binding the rod or otherwise interfering with the proper operation of the cylinder.

A further object of the invention is to provide a seal of the aforesaid type which can be assembled on the hydraulic cylinder of a power steering system of an automobile without removing the cylinder from the vehicle and without removing any parts of the hydraulic cylinder with the exception of the original worn seal and associated parts.

Another object of the present invention is to provide a seal for a hydraulic cylinder which will effectively compensate for any normal wear of the cylinder rod, and which can be manipulated to tighten or otherwise adjust the seal with the use of only one hand, and while the cylinder is positioned in difficult to reach locations.

Additional objects and advantages of the present invention will become apparent from the following description with reference to the accompanying drawings, wherein:

FIGURE 2 is an enlarged view of the hydraulic cylinder shown in FIGURE 1 with the present seal construction being shown in cross section and most of the remainder of the hydraulic cylinder being shown in elevation;

FIGURE 4 is a transverse cross sectional view of the present seal construction, taken on line 4—4 of FIGURE 2.

Figure 1:
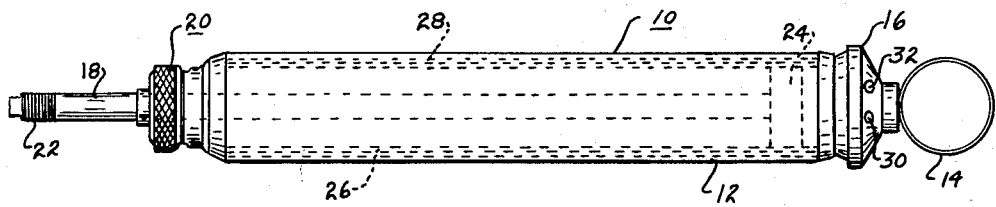
FIGURE 1 is a side elevational view of a conventional hydraulic cylinder used in power steering systems for automobiles, showing my special seal construction assembled thereon, the cylinder being removed from the system and automobile.
Figure 3:
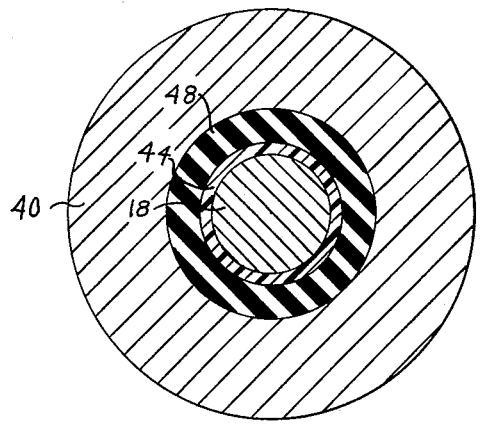
FIGURE 3 is a transverse cross sectional view of the present seal construction, taken on line 3—3 of FIGURE 2.

Referring more specifically to the drawings, numeral 10 designates a hydraulic cylinder of a power steering mechanism for an automobile, numeral 12 the cylinder sidewall, 14 a ring fixture secured to end member 16 and adapted to be mounted onto the frame of the automobile, numeral 18 the cylinder rod, and numeral 20 the present seal construction for sealing the fluid in cylinder wall 12 and preventing leakage around the rod as the rod reciprocates within the cylinder. Rod 18 is threaded at numeral 22 on the free end thereof and secured at the other end to a piston 24, which is reciprocably mounted in a cylindrical sleeve 26 disposed in and spaced from wall 12. Sleeve 26 is spaced inwardly from wall 12 to provide an annular passage 28 for the passage of fluid from port 30 to the opposite end of the cylinder for reacting on the left-hand side of piston 24 as viewed in FIGURE 1. Fluid is admitted through port 32 into the cylinder for reacting on the right-hand side of piston 24. The elements thus far described with reference to the hydraulic cylinder may be considered conventional for the purpose of the description of the present invention, and hence will not be described in detail herein. The manner in which the foregoing hydraulic cylinder is mounted in the power steering system of the automobile is likewise standard or conventional, and will not be described here.

The present seal 20 is mounted in the end of end member 40, which is secured to sidewall 12 and to sleeve 26 in fluidtight relation, forming a rigid structure with said sidewall and sleeve. Cylinder rod 18 extends through an opening 42 in the center of end member 40 and reciprocates therein in response to fluid pressure on opposite sides of piston 24. In the present seal construction, the sealing function is performed primarily by a Teflon sealing band 44 of rather thin wall construction which slips snugly over rod 18 into an annular recess 46, concentrically arranged with respect to hole 42, and a gasket of rubber or rubber-like material 48 embracing the sealing band 44 and likewise seating in recess 46, band 44 and gasket 48 abutting firmly against the inner end 50 of recess 46. With the band 44 and gasket 48 assembled in the foregoing manner, the resiliency of the gasket and the yieldability of the band cause band 44 to fit snugly on rod 18 without causing any substantial binding thereof in forming an effective seal. The gasket is held firmly in place by an anchor ring 52 seated within an enlarged annular recess 54, and seated against the end of gasket 48, ring 52 being merely pressed axially into recess 54 and held therein by a resilient annular locking ring 56 seated in annular groove 58 in the wall of member 40.

Band 44 and gasket 48 are seated firmly in recess 46 by adjustment nut 60, having an externally threaded stem 62 threadedly received in the internally threaded wall of anchor member 52. Nut 60 is slipped axially on rod 18 and rotated to screw threaded stem 62 into anchor ring 52. One of the important features of the present seal construction is the means whereby rotation of anchor ring 52 is prevented when nut 60 is rotated in the assembly operation. This means is shown in FIGURE 4, and consists of a flattened surface 64 creating an arcuate recess 66 in which is disposed a small metal ball 68. In the event anchor ring 52 attempts to rotate as nut 60 is tightened into the ring, ball 68 becomes wedged or locked between the wall of recess 54 and the external surface 64 of the anchor ring, the wedging of the ball firmly in this position preventing any further rotation of anchor ring 52. Likewise, when the nut is rotated in the direction to remove it from rod 18, the ball becomes wedged between the wall of recess 54 and surface 64 at the opposite end of recess 66 and prevents further rotation of the anchor ring in that direction. Nut 60 can be tightened inwardly to create the desired firmness of the seal, the inner end of stem 62 being beveled at numeral 70 to engage the adjacent end of band 44 and gasket 48.

After nut 60 has been tightened into position in the manner described above, it is locked in place by a set screw 72 extending through a threaded hole 74 and engaging a washer 76 disposed between the enlarged end of nut 60 and the adjacent end of member 40. As an auxiliary seal, an O-ring gasket 78 or the like is preferably included in the internal surface of nut 60. Further, in order to prevent grit and other foreign matter from entering the seal and causing excess wear, a scraping or cleaning member 82 with an annular lip 84 is secured to the end of nut 60 and held in place by a washer 85 secured rigidly thereto by swaging inwardly a flange 86.

Whenever it is necessary to increase the pressure on band 44 and gasket 48, it is merely necessary to loosen set screw 72 and rotate nut 60, which is preferably knurled on the external surface, inwardly to tighten the inner end of stem 62 onto the adjacent end of the band and gasket. After the adjustment is made, the set screw is again tightened to secure the assembled sealing construction in place.

One of the particular advantages of the present invention is its adaptability to a variety of different types of fluid cylinders and its construction which permits the seal to be completely installed without any major repair or overhauling work. Further, it can be adjusted readily while the vehicle is on the road without the use of any tools, or by merely using a screw driver and a pair of pliers or a single wrench. The present seal construction can be adjusted at various times throughout the operation of the cylinder without causing any substantial binding of rod 18 by the seal, or without otherwise interfering with the proper operation of the cylinder. While only one embodiment of the present invention has been described in detail herein, various changes and modifications may be made without departing from the scope of the invention, and certain features of the present construction may be used in conjunction with similar gaskets.

I claim:

1. A hydraulic cylinder comprising a wall forming a chamber, a piston in said chamber, a rod connected to the piston and extending beyond the end of the cylinder, an end member for said cylinder having a bore for receiving said rod and a cylindrical recess surrounding said bore and extending inwardly from the outer end and terminating in an annular shoulder around said bore, a Teflon sealing band around the rod and seated in said recess against said shoulder, a gasket of rubber around said band in said recess, an anchor ring seated in said recess against said gasket and having a central threaded hole spaced from said rod and a flat portion on the periphery, a ball disposed on said portion within said recess, a snapring for retaining said ring in said recess, a nut having a bore for said rod and an externally threaded stem for threading into said anchor ring and abutting against said band and gasket, a washer on said stem between said nut and said end member, and a set screw in said nut adapted to engage said washer.

2. A fluid cylinder comprising a wall forming a chamber, a piston in said chamber, a rod connected to the piston and extending beyond the end of the cylinder, an end member for said cylinder having a bore for receiving said rod and a cylindrical recess surrounding said bore and extending inwardly from the outer end and terminating in an annular shoulder around said bore, a Teflon sealing band around the rod and seated in said recess against said shoulder, a gasket of rubber around said band in said recess, a ring seated in said recess against said gasket and having a central threaded hole spaced from said rod and a flattened portion on the periphery, a ball disposed on said portion within said recess, a means for retaining said ring in said recess, and a nut having a bore for said rod and an externally threaded stem for threading into said ring and abutting against said gasket.

3. A fluid cylinder comprising a wall forming a chamber, a piston in said cylinder, a rod connected to the piston and extending beyond the end of the cylinder, an end member for said cylinder having a bore for receiving said rod and a cylindrical recess surrounding said bore and extending inwardly from the outer end and terminating in an annular shoulder around said bore, a sealing band of resilient but firm material around the rod and seated in said recess against said shoulder, a gasket of resilient material around said band in said recess, a ring in said recess having a central threaded hole spaced from said rod and a flattened portion on the periphery, a ball disposed on said portion within said recess, a means for retaining said ring in said recess, and a nut having a bore for said rod and an externally threaded stem for threading into said ring.

4. A seal construction for use in conjunction with a fluid cylinder having a wall forming a chamber, a piston in said cylinder, a rod connected to the piston and extending beyond the end of the cylinder, and an end member with a bore for receiving said rod and a cylindrical recess surrounding said bore and extending inwardly from the outer end and terminating in an annular shoulder around said bore: said construction comprising a Teflon sealing band around the rod and seated in said recess against said shoulder, a gasket of rubber around said band in said recess, a ring seated in said recess against said gasket and having a central threaded hole spaced from said rod and a flattened portion on the periphery, a round member disposed on said portion within said recess, a means for retaining said ring in said recess, a nut having a bore for said rod and an externally threaded stem for threading into said ring, a washer on said stem between said nut and said end member, and a set screw in said nut adapted to engage said washer.

5. A seal construction for use in conjunction with a fluid cylinder having a wall forming a chamber, a piston in said cylinder, a rod connected to the piston and extending beyond the end of the cylinder, and an end member with a bore for receiving said rod and a cylindrical recess surrounding said bore and extending inwardly from the outer end and terminating in an annular shoulder around said bore: said construction comprising a plastic sealing band around the rod and seated in said recess against said shoulder, an annular member of resilient material around said band in said recess, a ring seated in said recess against said annular member and having a central threaded hole spaced from said rod and a flattened portion on the periphery, a round member disposed on said portion within said recess, a means for retaining said ring in said recess, and a nut having a bore for said rod and an externally threaded stem for threading into said ring.

6. A seal construction for use in conjunction with a fluid cylinder having a wall forming a chamber, a piston in said cylinder, a rod connected to the piston and extending beyond the end of the cylinder and an end member with a bore for receiving said rod and a cylindrical recess surrounding said bore and extending inwardly from the outer end and terminating in an annular shoulder around said bore: said construction comprising a sealing band of resilient but firm material, an annular member of resilient material around said band in said recess, a ring seated completely within said recess against said annular member and having a central threaded hole spaced from said rod, a means disposed at the outer end of said ring for retaining said ring in said recess, and a nut having a bore for said rod and an externally threaded stem for threading into said ring.

7. For use in conjunction with a fluid cylinder having a wall forming a chamber, a piston in said cylinder, a rod connected to the piston and extending beyond the end of the cylinder and an end member for said cylinder having a bore for receiving said rod and a cylindrical recess surrounding said bore and extending inwardly from the outer end and terminating in an annular shoulder around said bore: a sealing construction comprising a gasket of resilient material in said recess, a ring seated in said recess against said gasket and having a central threaded hole spaced from said rod and a flattened portion on the periphery, a round member on said portion in said recess, a means for retaining said ring in said recess, and a nut having a bore for said rod and an externally threaded stem for threading into said ring.

8. A seal construction for use in conjunction with a fluid cylinder having a wall forming a chamber, a piston in said cylinder, a rod connected to the piston and extending beyond the end of the cylinder, and an end member with a bore for receiving said rod and a cylindrical recess surrounding said bore and extending inwardly from the outer end and terminating in an annular shoulder around said bore: said construction comprising a sealing band of resilient but firm material around said rod, an annular member of resilient material in said recess, a ring seated completely within said recess against said annular member and having a central threaded hole spaced from said rod, a means disposed at the outer end of said ring for retaining said ring in said recess, and a nut having a bore for said rod and an externally threaded stem for threading into said ring.

9. In a seal construction for use in conjunction with a fluid cylinder having a wall forming a chamber, a piston in said cylinder, a rod connected to the piston and extending beyond the end of the cylinder and an end member with a bore for receiving said rod and a cylindrical recess surrounding said bore and extending inwardly from the outer end and terminating in an annular shoulder around said bore: a sealing member in said recess, a ring in said recess adjacent said sealing member and having a central threaded hole spaced from said rod and a flattened portion on the periphery, a round member disposed on said portion within said recess, and an externally threaded stem for threading into said ring.

References Cited in the file of this patent

UNITED STATES PATENTS

| | | |
|---|---|---|
| 673,572 | Barrow | May 7, 1901 |
| 1,417,812 | Elmore | May 30, 1922 |
| 2,567,527 | Parks | Sept. 11, 1951 |
| 2,634,145 | Monoahan | Apr. 7, 1953 |
| 2,646,959 | Carver | July 28, 1953 |
| 2,982,590 | Gunning | May 2, 1961 |
| 2,990,224 | Rozner | June 27, 1961 |
| 3,028,183 | Phillips | Apr. 3, 1962 |
| 3,084,945 | Alexander | Apr. 9, 1963 |

FOREIGN PATENTS

| | | |
|---|---|---|
| 673,838 | France | Oct. 14, 1929 |